United States Patent
Nojima

[11] Patent Number: 5,950,424
[45] Date of Patent: Sep. 14, 1999

[54] DIESEL ENGINE EXHAUST PARTICLE COLLECTION DEVICE

[75] Inventor: Kouzaburou Nojima, Tokyo, Japan

[73] Assignee: Kabushiki Kaisya O - Den, Tokyo, Japan

[21] Appl. No.: 08/726,904

[22] Filed: Oct. 7, 1996

[30] Foreign Application Priority Data

Oct. 24, 1995 [JP] Japan .................................. 7-275540

[51] Int. Cl.⁶ .................................. F01N 3/02; F01N 9/00
[52] U.S. Cl. .......................... 60/275; 55/DIG. 30; 95/57; 96/15
[58] Field of Search ............... 60/275, 297; 55/DIG. 30; 95/57; 96/15, 62, 60

[56] References Cited

U.S. PATENT DOCUMENTS

| | | | |
|---|---|---|---|
| 1,130,212 | 3/1915 | Steere | 95/81 |
| 2,556,982 | 6/1951 | Roos et al. | 96/66 |
| 3,157,479 | 11/1964 | Boles | 60/275 X |
| 3,526,081 | 9/1970 | Kusters | 60/275 X |
| 3,768,258 | 10/1973 | Smith et al. | 60/275 |
| 4,316,360 | 2/1982 | Liu et al. | 60/275 |
| 4,588,423 | 5/1986 | Gillingham et al. | 96/43 |
| 5,125,230 | 6/1992 | Leonard | 60/275 X |

FOREIGN PATENT DOCUMENTS

| | | | |
|---|---|---|---|
| 1184850 | 4/1985 | Canada | 60/275 |
| 1 047 054 | 12/1953 | France . | |
| 1 410 881 | 8/1965 | France . | |
| 56-126612 | 10/1981 | Japan . | |
| 57-117711 | 7/1982 | Japan . | |
| 61-55114 | 4/1986 | Japan . | |
| 61-84851 | 6/1986 | Japan . | |
| 62-180620 | 11/1987 | Japan . | |
| 1-273817 | 11/1989 | Japan . | |
| 2-75716 | 3/1990 | Japan . | |
| 2-241559 | 9/1990 | Japan . | |
| 3-59050 | 6/1991 | Japan . | |

*Primary Examiner*—Tony M. Argenbright
*Attorney, Agent, or Firm*—Oblon, Spivak McClelland, Maier & Neustadt, P.C.

[57] ABSTRACT

A collection device for collecting, under electrical control, particles (10) in an exhaust from a diesel engine is disclosed. The device has a needle electrode (8) having a needle tip (8a) for charging up the particles (10) by creating a corona discharge around the needle tip (8a) collecting electrode (11) for collecting the charged particles (10a) by electrostatic force and a high voltage power source (13) for applying prescribed high voltage between the needle electrode (8) and the collecting electrode (11), the high voltage power source (13) electrically being connected with the needle electrode (8) and the collecting electrode (11).

11 Claims, 15 Drawing Sheets

38: BAFFLE PLATE

38

FIG. 13
(a)
FIG. 13
(b)
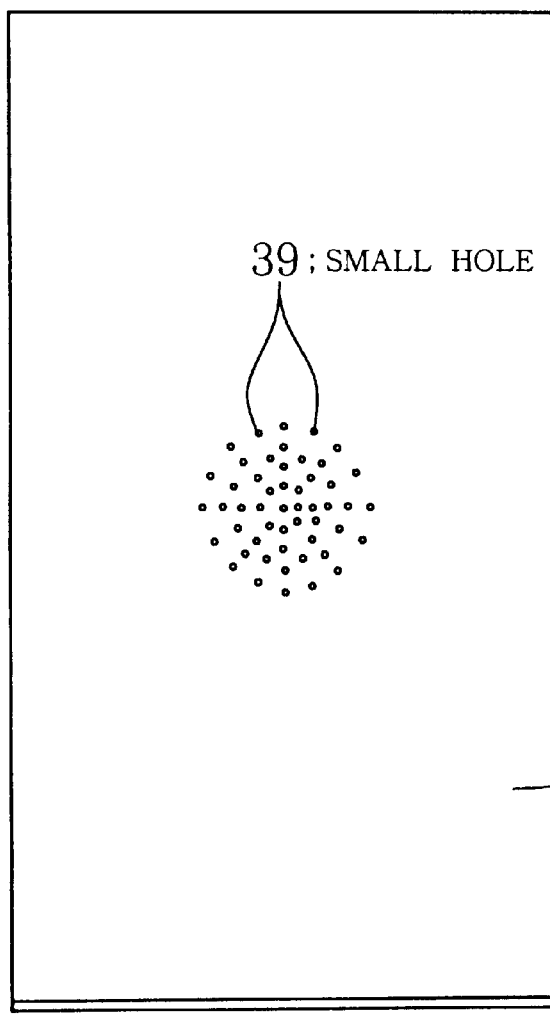
39; SMALL HOLE
38a; BAFFLE PLATE
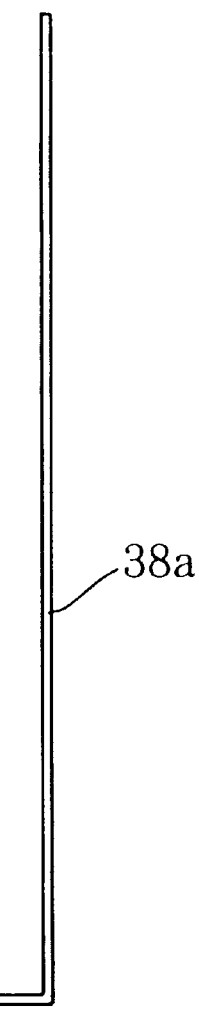
38a

DIESEL ENGINE EXHAUST PARTICLE COLLECTION DEVICE

BACKGROUND OF THE INVENTION

1. Field of the Invention

The present invention relates to an electrically controlled diesel engine exhaust particle collection device.

2. Description of the Prior Art

As is well known, the exhaust of diesel engines contains large quantities of carbon particles (so-called black smoke); these carbon particles are discharged into the atmosphere through the exhaust passage and, after blowing about in the air for a long time, finally settle in the form of soot on to floors, road surfaces and clothing etc. However, it has gradually become clear that, since carbon possesses strong adsorption for other substances, various chemical substances such as carcinogen-related substances are adsorbed on to the carbon particles whilst they are free in the air, and that the entry of these into the human body when such carbon particles are breathed in by people causes cancer or diseases of the respiratory system. The diesel engines used in vehicles such as trucks and buses therefore now represent a considerable social problem as a source of environmental air pollution.

Accordingly, in order to protect the environmental air from contamination by diesel black smoke, as set out in Japanese Utility Model Application Kokai Sho.61-55114 and Japanese Utility Model Application Kokai Sho.61-84851, a black smoke collection device has been proposed wherein a black smoke removal filter consisting of metallic fibres and/or a honeycomb-shaped element or the like is arranged in the exhaust passage of a diesel engine mounted on a vehicle. However, such black smoke removal filters have the drawbacks that, when used for a long time, they get clogged up by the black smoke which they collect and pressure loss is increased.

As a means for eliminating this inconvenience, there has been proposed an electrostatic diesel particle filter which is not subject to clogging, as described in Japanese Patent Application Kokai H.2-75716. FIG. 15 is an axial cross-sectional view of the construction of the electrostatic diesel particle filter described in this publication. As shown in this Figure, in outline, this electrostatic diesel particle filter consists of: a generally tubular flow chamber 1; a corona electrode 2 consisting of a very fine linear body such as a tungsten wire stretched along the flow chamber axis in this flow chamber 1; a cylindrical isolating electrode 3 arranged facing this corona electrode 2; and a voltage source 4 whereby high voltage is applied between corona electrode 2 and isolating electrode 3. With this construction, when an exhaust gas current 5 enters flow chamber 1, carbon particles 6 contained in exhaust gas current 5 are charged up by the corona discharge and thereby deflected by the electrostatic force towards isolating electrode 3, where they are collected. As a result, clean exhaust gas current 7 whose black smoke has been reduced in amount is discharged from the diesel particle filter.

However, with such a conventional electrostatic diesel particle filter, the electrical field concentration is dispersed along the line of the corona electrode, so even though high voltage is applied, the corona discharge does not occur continuously or occurs only to a slight degree; as a result, the serious practical difficulties are produced that the exhaust particle collection capability for black smoke etc. is unstable and very small. Furthermore, since the corona electrode is a very fine linear body such as a tungsten wire, when it is mounted in a vehicle, which is subject to incessant vibration and shocks during running, there is the inconvenience that it will frequently become disconnected.

SUMMARY OF THE INVENTION

With the foregoing in view, it is an object of the present invention to provide a diesel engine exhaust particle collection device that provides outstanding exhaust particle capturing ability and durability even under severe conditions such as when mounted in a vehicle.

According to a first aspect of the present invention, there is provided a diesel engine exhaust particle collection device for collecting, under electrical control, particles in an exhaust from diesel engine, comprising: a needle electrode having a needle tip for charging up the particles by creating a corona discharge around the needle tip; a collecting electrode for collecting the charged particles by electrostatic force; and a high voltage power source for applying prescribed high voltage between the needle electrode and the collecting electrode, the high voltage power source electrically being connected with the needle electrode and the collecting electrode.

According to a second aspect of the present invention, there is provided a diesel engine exhaust particle collection device for collecting, under electrical control, particles in an exhaust from diesel engine, comprising: a needle electrode having a needle tip for charging up the particles by creating a corona discharge around the needle tip; a collecting electrode for collecting the charged particles by electrostatic force; a deflection electrode for imparting deflection force to said charged particles towards said collecting electrode; and the high voltage power source being adapted to apply prescribed high voltage between the needle electrode and the collecting electrode and between the deflection electrode and the collecting electrode.

In the foregoing, a mode is preferable in which, in a condition in which the needle electrode has its needle tip pointing towards the upstream side of the exhaust passage, an electrode coupler of the needle electrode and deflection electrode is formed by arranging the rod-shaped deflection electrode projecting at the leading end.

Also, a mode is preferable in which single or plural tunnels through which the exhaust gas passes are defined by an electrode plate of the collection electrode, and the electrode assemblies is arranged between the needle electrode and rod-shaped deflection electrode in each of the above tunnels.

Furthermore, a mode is preferable in which a large number of tunnels demarcated by electrode plates of the above collection electrode are arranged in matrix fashion, and electrode assemblies consisting of a needle electrode and deflection electrode are arranged in the tunnels.

Also, a mode is preferable in which a large number of tunnels demarcated by the electrode plate of the collection electrode are arranged in lattice fashion, and there are provided a single or a plurality of collection units in which the electrode assemblies consisting of a needle electrode and a deflection electrode are arranged in each tunnel, and a device casing that holds these collection units in received condition and which is equipped with an exhaust gas flow inlet and flow outlet.

The collection unit may be held in the received condition in the device casing in a freely removable manner.

A mode is also preferable wherein a collection unit consists of a concave electrode subunit wherein a large number of tunnels demarcated by electrode plates of the collection electrode are arranged in lattice fashion and a convex electrode subunit constituted by a plurality of the electrode assemblies consisting of a needle electrode and a deflection electrode arranged respectively to correspond to the tunnels, and wherein the concave electrode subunits and convex electrode subunits are freely and removably fitted to each other.

It is also preferable to set the area of the region, of the cross-sectional area of the collection unit, that essentially constitutes the channel for the exhaust gas at least twice as large as the cross-sectional area of the exhaust gas passage of the diesel engine.

Also, while positive-polarity high voltage is applied to the needle electrode, for example, so as to generate positive ions by the creation of a corona discharge around the tip of the needle, the collection electrode is earthed.

Also, it is very effective to provide speed-reduction means for smoothly slowing down the flow of exhaust gas in the vicinity of the needle electrode.

Also, as an ideal mode of utilizing the diesel engine, it may be mounted in a vehicle.

BRIEF DESCRIPTION OF THE DRAWINGS

FIG. 13 is a view showing the construction of a baffle plate incorporated in this exhaust particle collection device, (a) being a rear face view while (b) is a side face view;

DESCRIPTION OF THE PREFERRED EMBODIMENTS

Modes for putting the present invention into practice are described below with reference to the drawings.

[A] First embodiment

Figure 1:
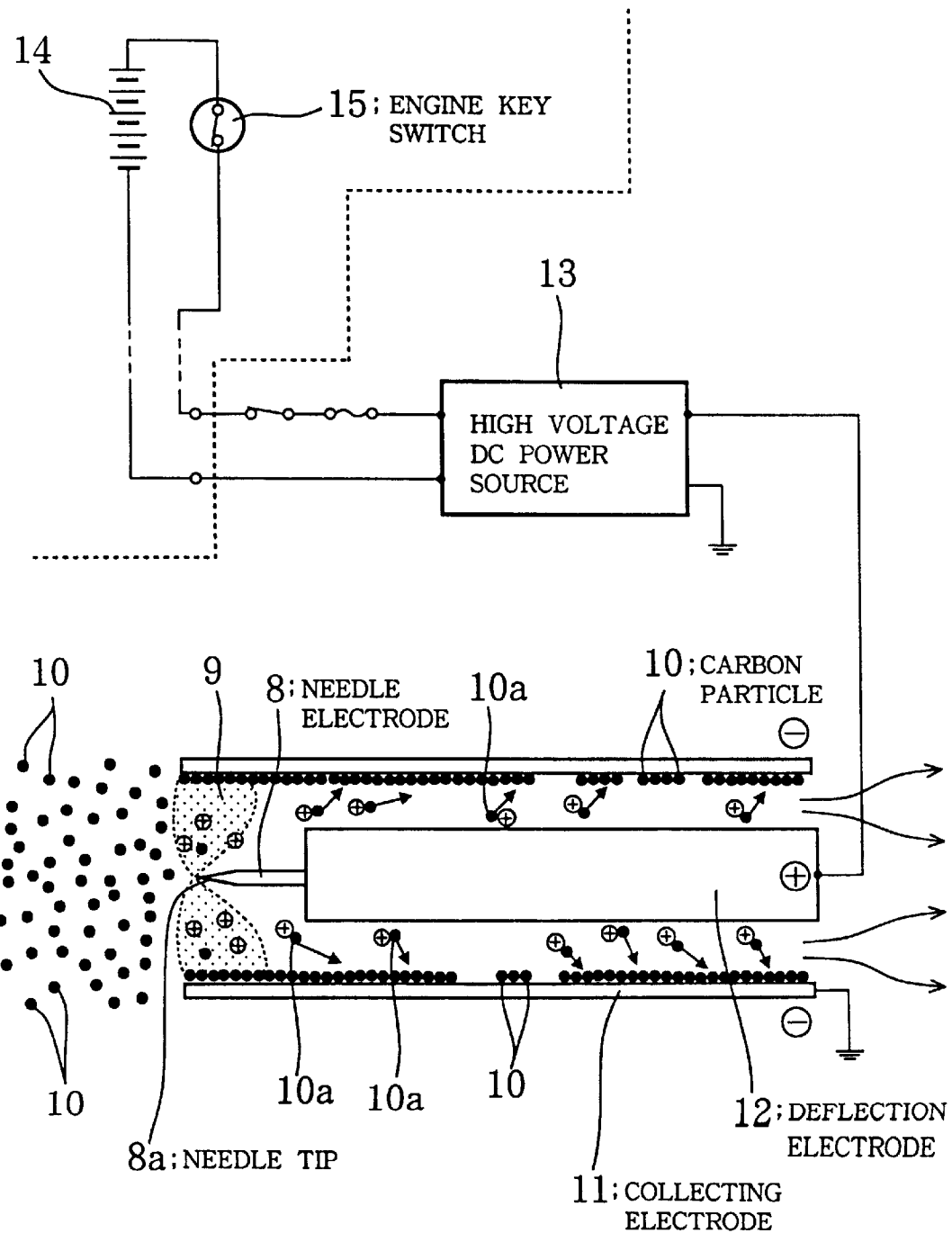
FIG. 1 is a diagram given in explanation of the basic construction and principles of operation of an electrically controlled diesel engine exhaust particle collection device constituting an embodiment of the present invention.
Figure 2:
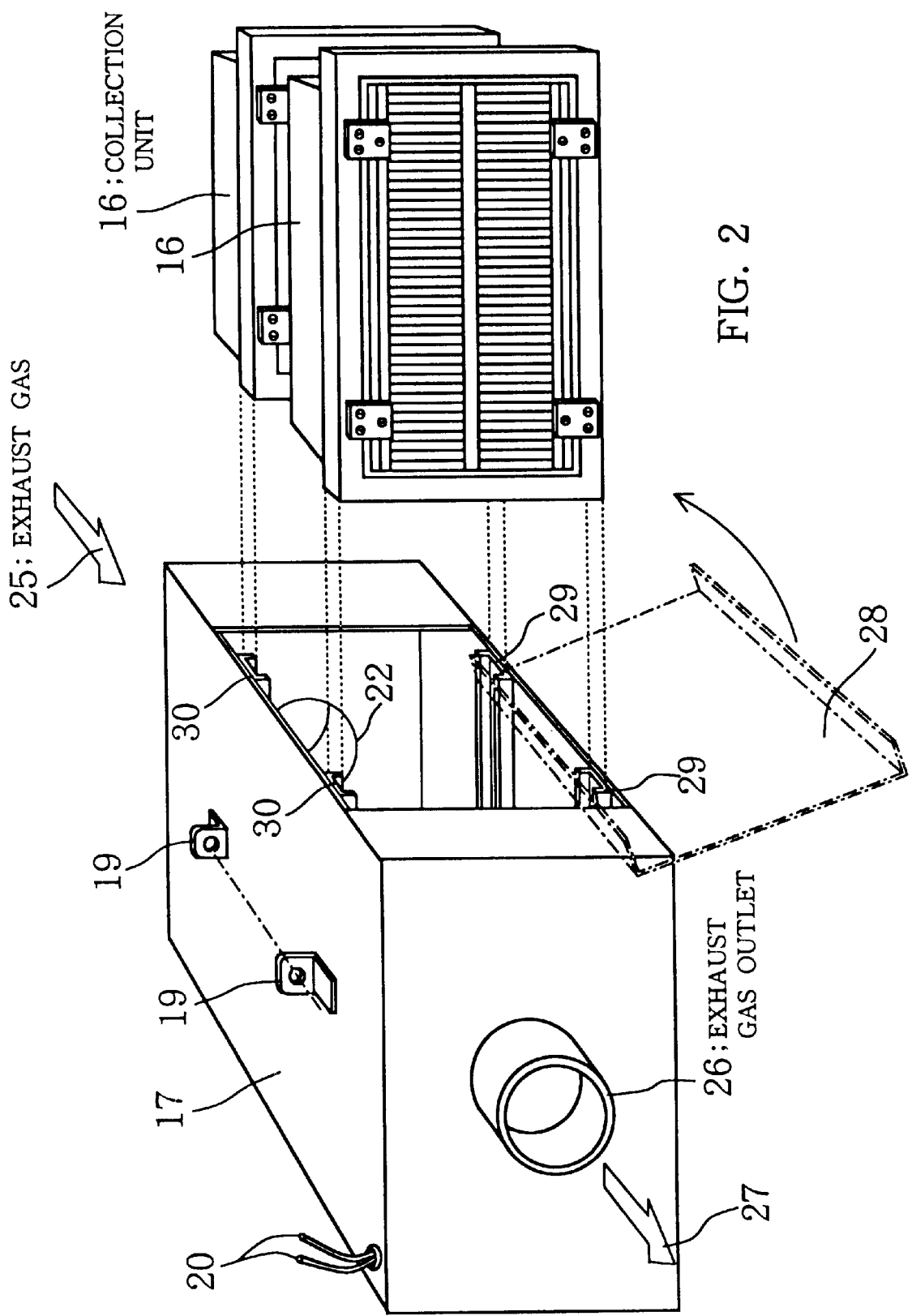
FIG. 2 is an exploded perspective view showing the construction of this exhaust particle collection device in exploded form.
Figure 3:
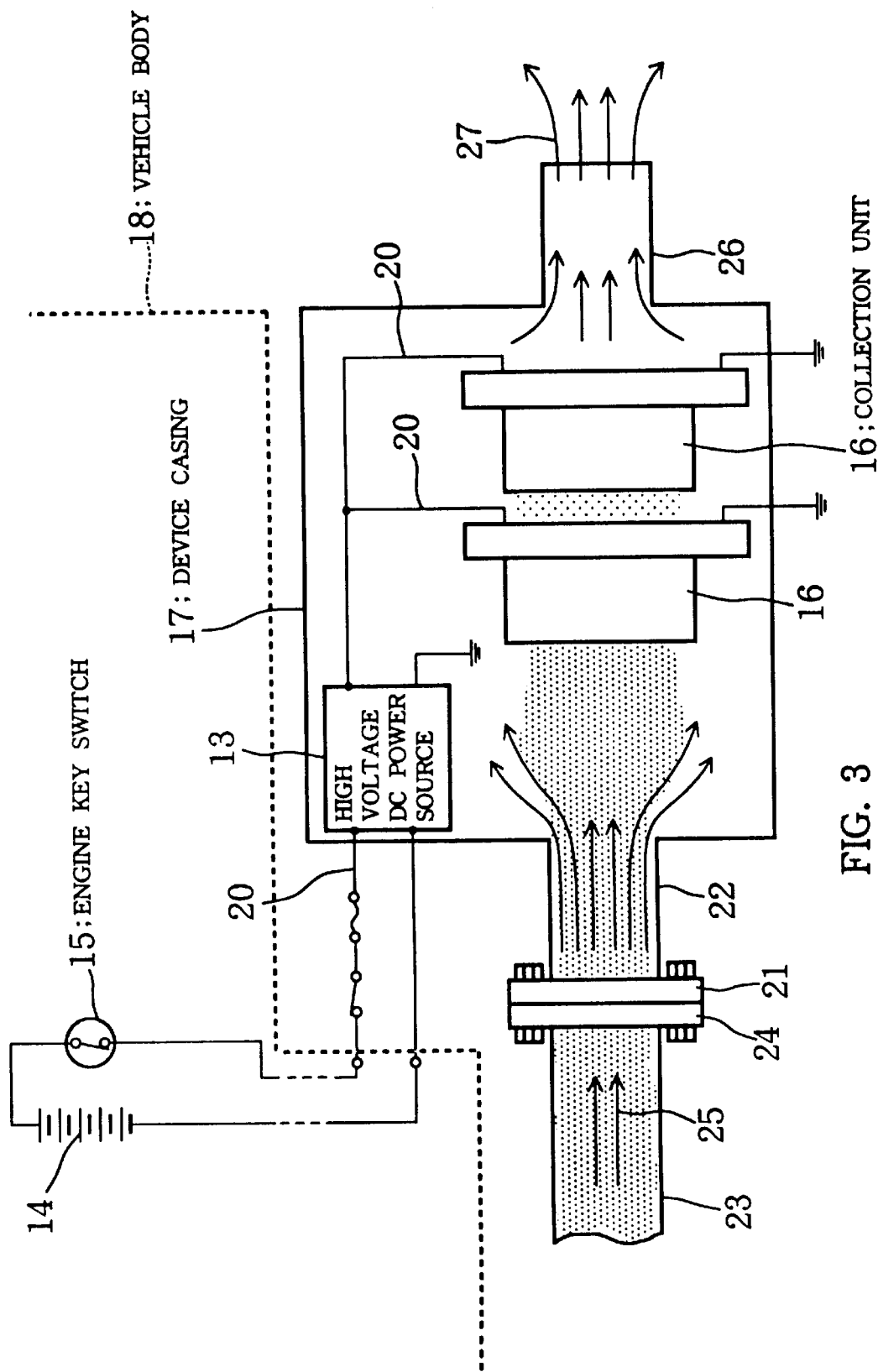
FIG. 3 is an electrical layout diagram of this exhaust particle collection device.
Figure 4:
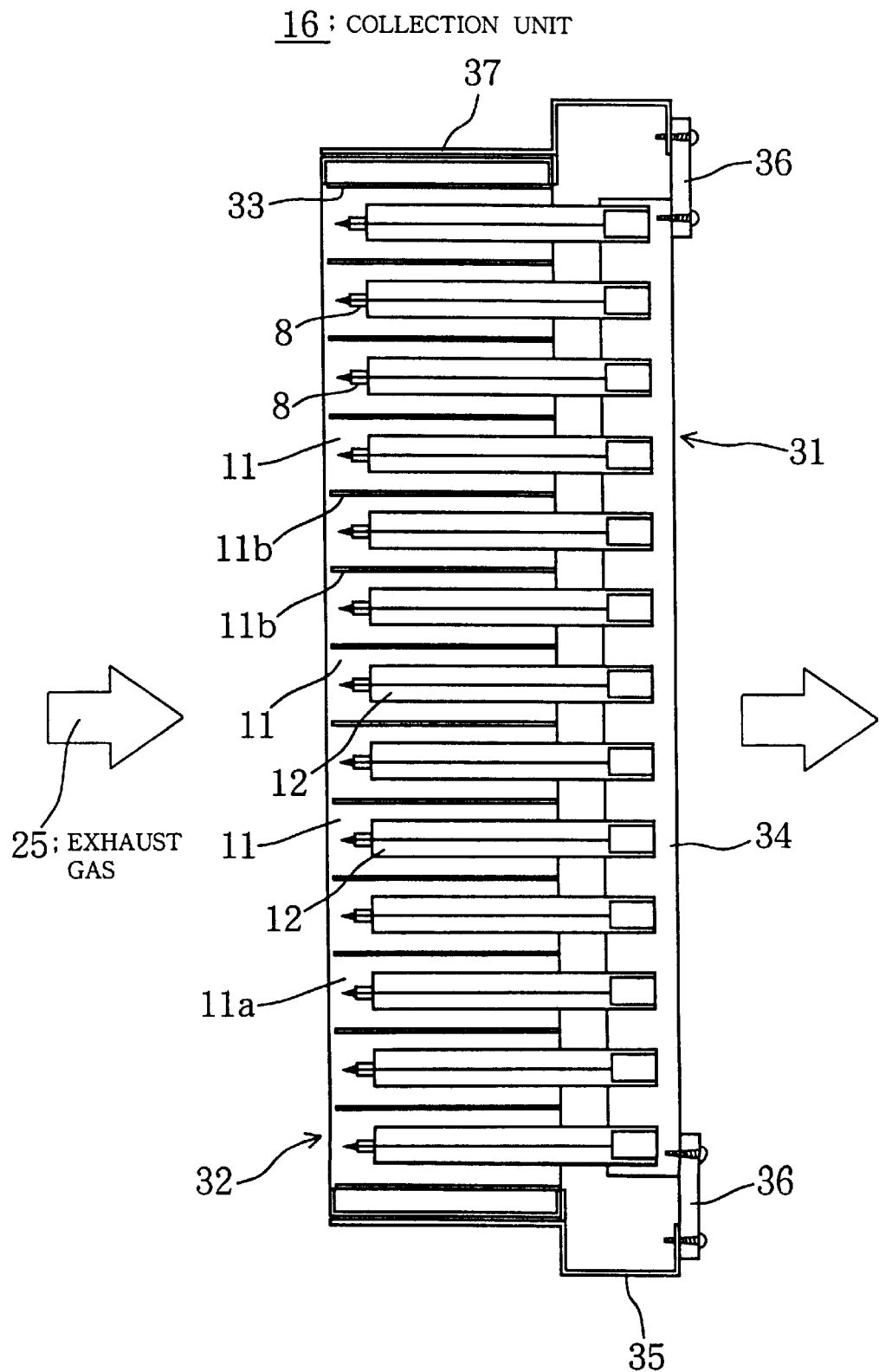
FIG. 4 is an axial cross-sectional view of a collection unit constituting a major part of this exhaust particle collection device.
Figure 5:
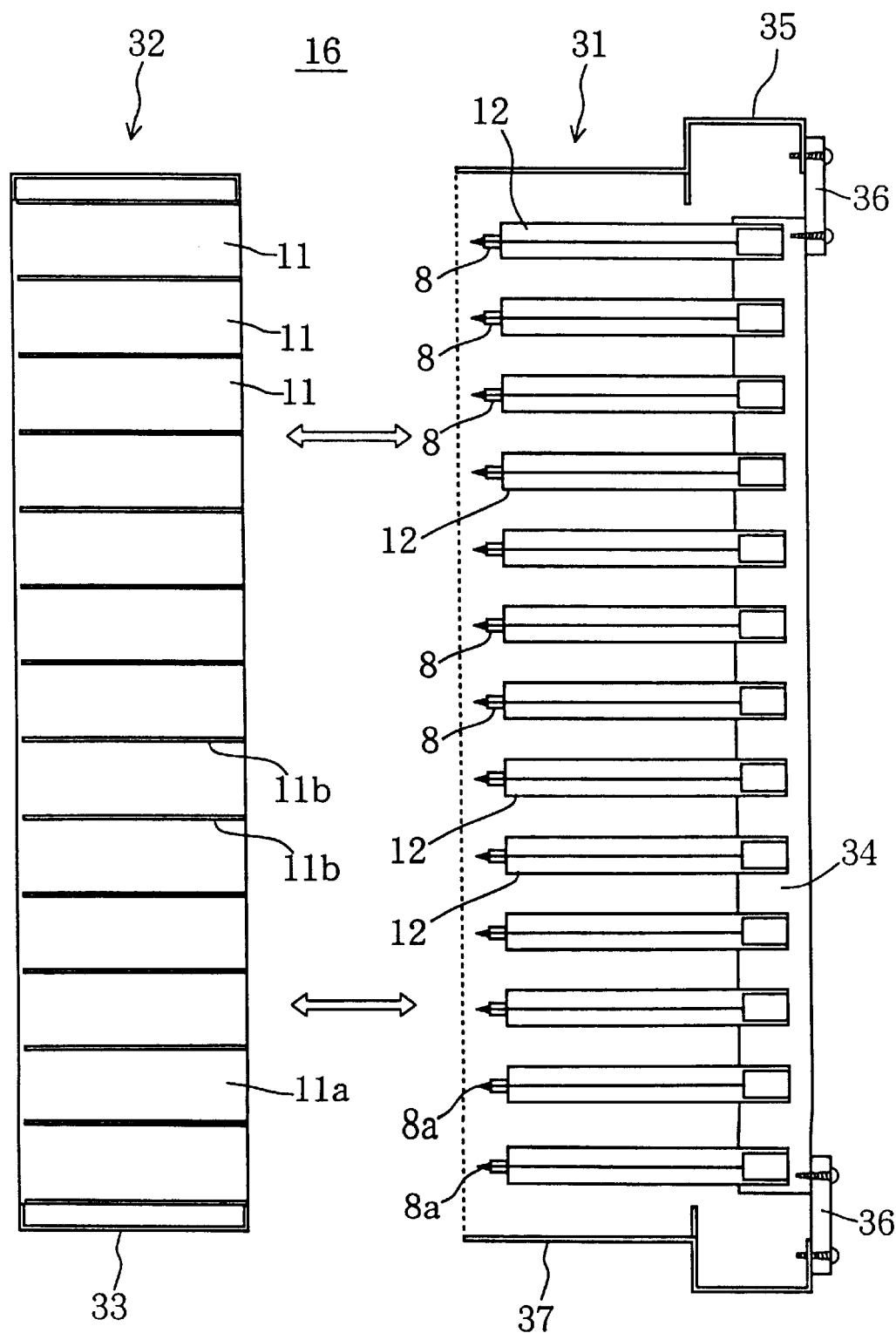
FIG. 5 is an axial cross-sectional view showing this collection unit disassembled into subunits.
Figure 6:
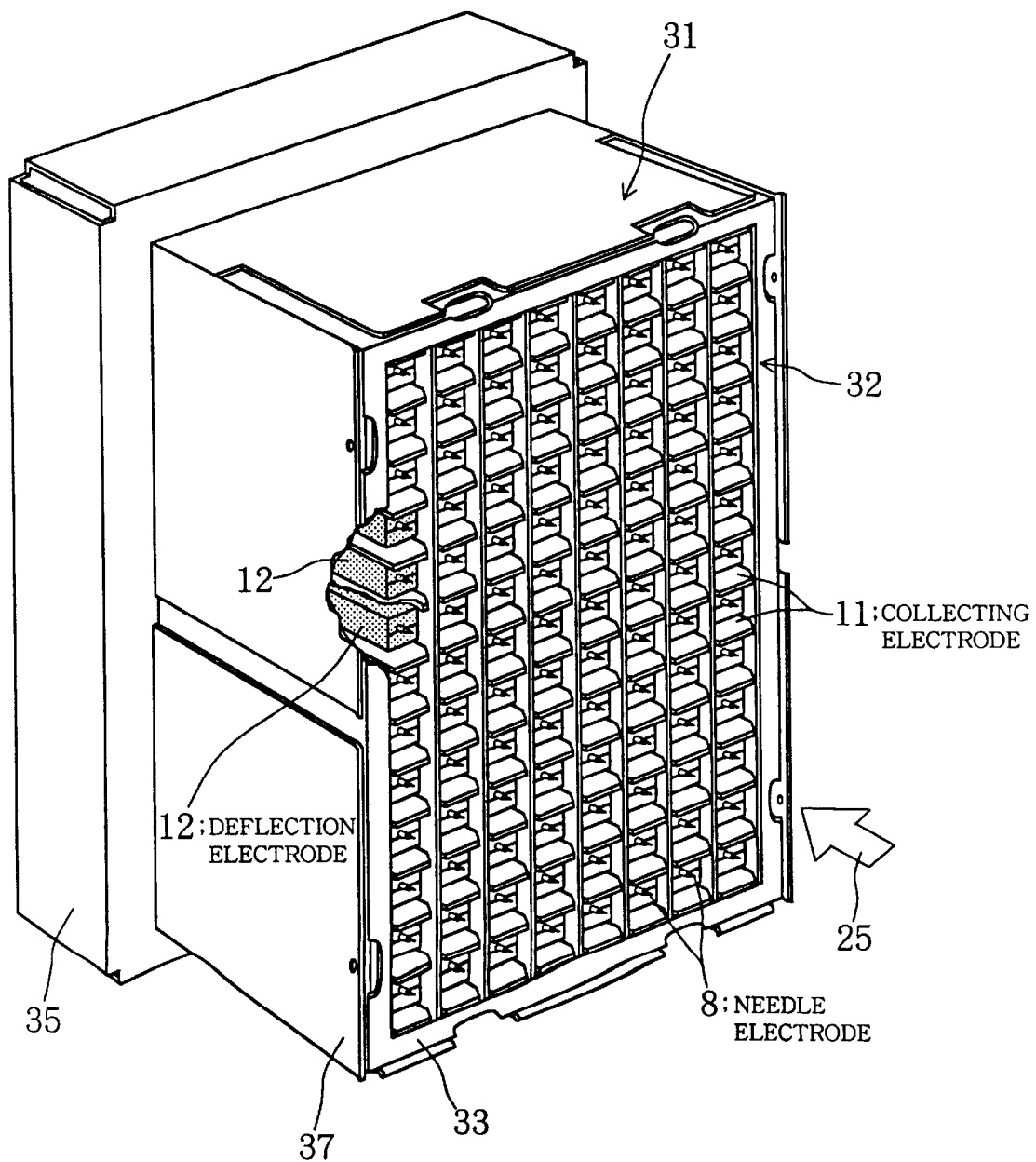
FIG. 6 is a perspective view showing this collection unit from the front (upstream side of the exhaust gas current)
Figure 7:
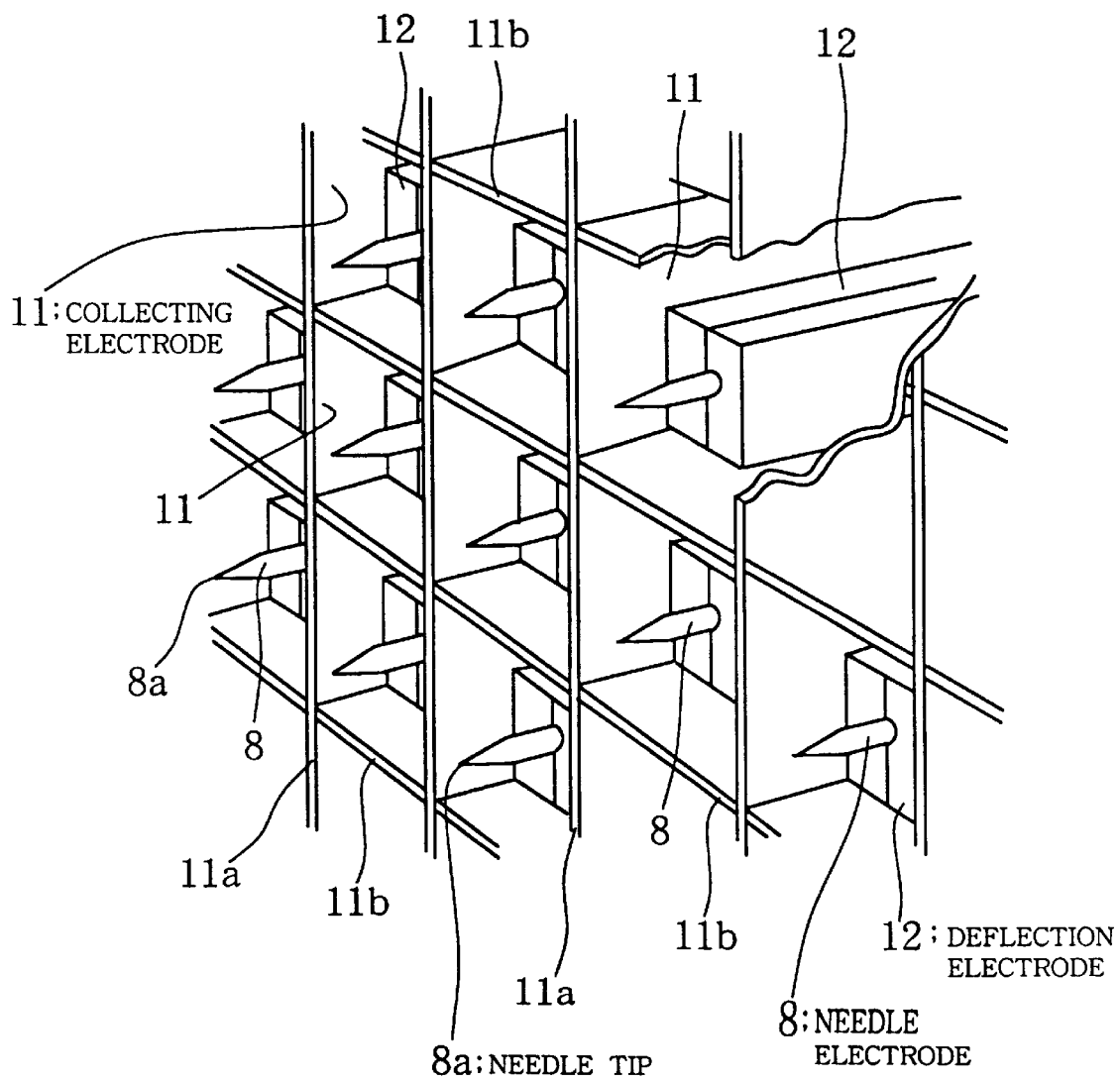
FIG. 7 is a detail view of part of FIG. 6 to a larger scale.
Figure 8:
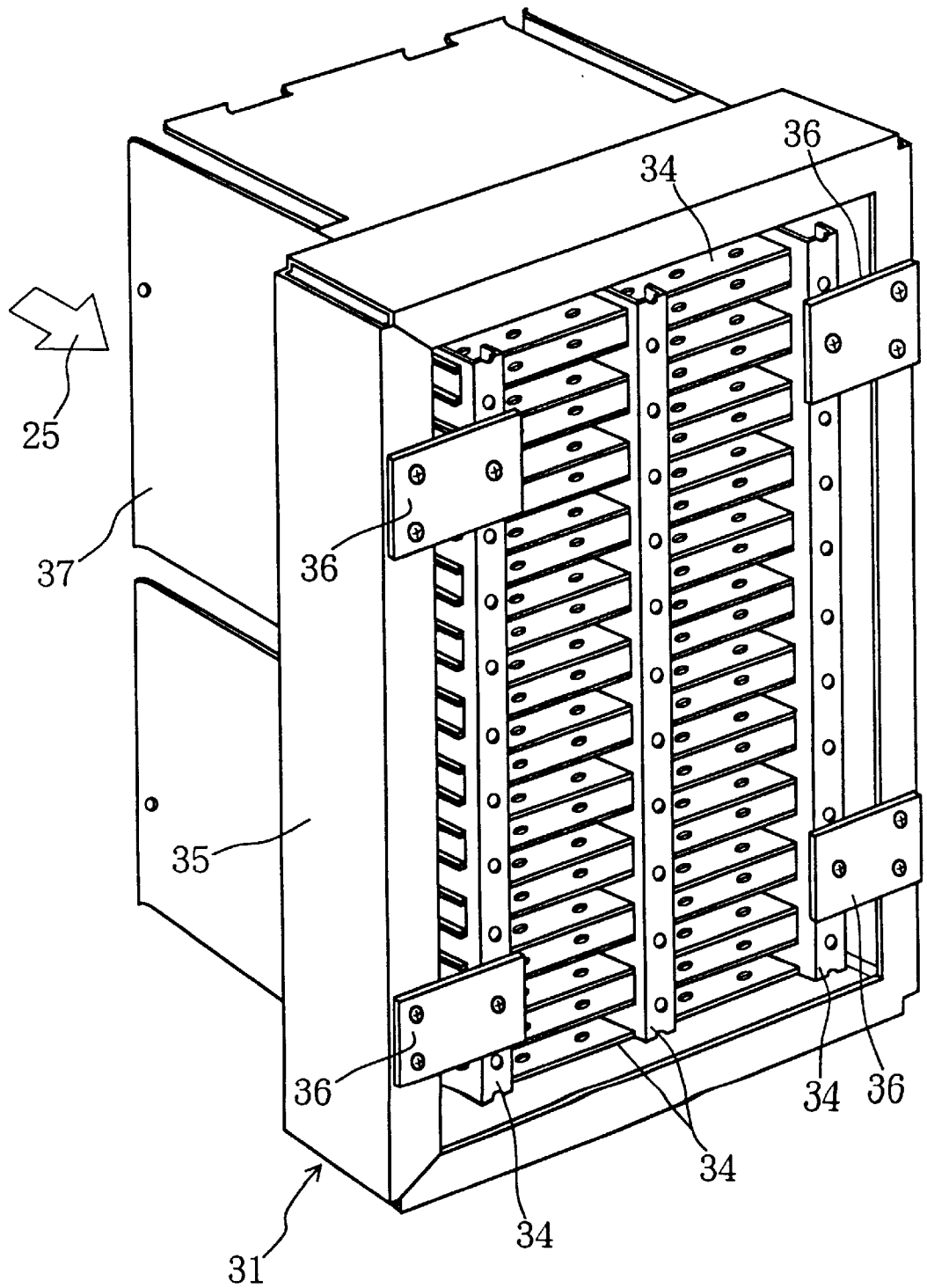
FIG. 8 is a perspective view seen from the rear of this collection unit (downstream side of the exhaust gas current)

FIG. 1 is a diagram given in explanation of the basic construction and principles of operation of an electrically controlled diesel engine exhaust particle collection device constituting an embodiment of the present invention; FIG. 2 is an exploded perspective view showing the construction of this exhaust particle collection device in exploded form; FIG. 3 is an electrical layout diagram of this exhaust particle collection device; FIG. 4 is an axial cross-sectional view of a collection unit constituting a major part of this exhaust particle collection device; FIG. 5 is an axial cross-sectional view showing this collection unit disassembled into subunits; FIG. 6 is a perspective view showing this collection unit from the front (upstream side of the exhaust gas current); FIG. 7 is a detail view of part of FIG. 6 to a larger scale; and FIG. 8 is a perspective view seen from the rear of this collection unit (downstream side of the exhaust gas current).

The exhaust particle collection device of this example relates to an exhaust cleaning device wherein carbon particles (black smoke) present in the exhaust are electrostatically collected by means of a needle discharge system, and that is mounted in the exhaust passage of a diesel engine mounted on a vehicle such as a truck or bus. First of all, the basic structure and principles of operation of this example will be described with reference to FIG. 1.

As shown in FIG. 1, the exhaust particle collection device of this example is essentially constituted by providing: a needle electrode 8 for charging up carbon particles (black smoke) 10, 10, . . . by creating a corona discharge 9 around the needle tip 8a; a collection electrode 11 for collecting these charged-up carbon particles (charged carbon particles) 10a, 10, . . . by electrostatic force; a deflecting electrode 12 for applying a deflecting force towards collecting electrode 11 to charged carbon particles 10a, 10a, . . . ; and a high voltage DC power source 13 for applying prescribed high DC voltages (in this example, 5 to 6 kV) between needle electrode 8 and collection electrode 11 and between deflection electrode 12 and collection electrode 11. Needle electrode 8 has its needle tip 8a, which is nickel-plated, directed towards the upstream side of the exhaust passage of the diesel engine and generally coincident with the common axis; in this example, it is fixed by welding or swaging or the like to the tip of a hollow square-rod shaped deflection electrode 12 about 10 mm square and of length 5 to 6 cm. In this way, an electrode assembly of a needle electrode 8 and deflection electrode 12 arranged generally on a common axis is formed.

For collection electrode 11, a tunnel-shaped electrode (about 20 mm square, length 5 to 6 cm) providing a passage for the exhaust gas is constituted by assembling four flat plate-shaped metal plates; an electrode assembly consisting of needle electrode 8 and deflection electrode 12 is arranged generally coaxially with the axis of the tunnel within the tunnel of collection electrode 11. Also, high voltage DC power source 13 consists of a DC—DC conversion circuit that steps up the DC voltage of 24 V that is supplied from the vehicle-mounted battery 14 to DC 5 to 6 kV and outputs this. The positive-polarity output terminal is connected to the electrode assembly (deflection electrode 12), while the negative-polarity output terminal is earthed. Collection terminal 11 itself is also earthed.

In the above construction, when the engine key switch (ignition switch) 15 is turned ON, the engine is started and, simultaneously, DC voltage of 24 V is supplied to high-voltage DC power source 13 from battery 14. When high voltage DC power source 13 receives the DC voltage of 24 V, it generates high voltage of DC 5 to 6 kV, which is then output to the electrode assembly (needle electrode 8 and deflection electrode 12 of mutually equal potential). Needle electrode 8 and deflection electrode 12 thereby become of high potential. However, in particular, since the electric field is concentrated at the needle tip 8a of needle electrode 8, a corona discharge 9 is generated continuously in stable fashion around needle tip 8a. Consequently, when the gas molecules of comparatively low ionization energy such as residual oxygen in the exhaust gas from the diesel engine pass this point, they are ionized, becoming plasma ions, which are adsorbed on to the carbon particles 10, causing the particles themselves to have a positive ionic charge. In this way, those of carbon particles 10a that are thus charged and which are close to collection electrode 11 are adsorbed on to the electrode plates of collection electrode 11, which are of negative potential. In contrast, charged carbon particles 10a, 10a, . . . that are further from the electrode plates of collection electrode 11 are first of all deflected (repelled) in the direction of collection electrode 11 by the positive potential of deflection electrode 12. When they approach collection electrode 11, they are adsorbed on to the electrode plates of negative-potential collection electrode 11. Consequently, very fine particles from about 0.01 $\mu$m up to comparatively large carbon particles 10, 10, . . . of about 10 $\mu$m can be efficiently collected.

Next, the detailed construction of the exhaust particle collection device of this example will be described with reference to FIG. 2 to FIG. 8.

The exhaust particle collection device of this example consists, in outline, of two front and rear box-shaped collection units 16, 16 consisting of a large number of needle electrodes 8, 8, . . . , deflection electrodes 12, 12, . . . , and collection electrodes 11, 11, . . . , together with high voltage DC power source 13, and a device casing 17 that receives and holds these.

As shown in FIG. 2, on the upper face of device casing 17, there are mounted a pair of mounting fittings 19, 19 for mounting and fixing the exhaust particle collection device of this example to vehicle body 18; at its corner it is formed with a through-hole to allow the passage of leads 20, 20 connected to the input terminal of high voltage DC power source 13. At the front face of device casing 17, as shown in FIG. 3, there is provided an exhaust inlet 22 of tubular shape fitted with a flange 21, and connected through flanges 21, 24 to an exhaust passage 23 downstream of the silencer, not shown, whereby exhaust gas 25 discharged from the diesel engine flows into the interior of device casing 17. On the rear face of device casing 17, there is provided an exhaust gas outlet 26 of tubular shape, whereby exhaust gas 27 from which the black smoke has been removed is discharged into the external environment. Also, a pivotable lid 28 is provided on one side face of device casing 17 so that collection units 16, 16 can be removed or inserted. Within the interior of device casing 17, with a prescribed separation between them, there is provided a pair of two floor rails 29, 29 arranged parallel to the front face, and two ceiling rails 30, 30 arranged at positions facing respective floor rails 29, 29, the construction being such that collection units 16, 16 are inserted into and held lined up in the forwards/rearwards direction in such a manner that they can be freely removed, by sliding forwards into the interior in a condition with collecting units 16, 16 fitted on to floor rails 29, 29 and the corresponding ceiling rails 30, 30. It should be noted that although not shown in FIG. 3, in the condition with collecting units 16, 16 inserted and held in device casing 17, the exhaust gas 25 that flows from exhaust inlet 22 into device casing 17 must inevitably pass successively through collection units 16, 16 before being discharged to the external environment.

As shown in FIG. 5, each collection unit 16 consists of a slotted-together structure of convex electrode subunit 31 and concave electrode subunit 32 which are both box-shaped and electrically isolated and, as shown in FIG. 4, FIG. 6 and FIG. 7, which have inserted therein electrode assemblies consisting of needle electrodes 8, 8 within each tunnel of collection electrodes 11, 11, . . . , of which a large number are arranged in lattice fashion, and deflection electrode 12, 12, . . . . Assemblies obtained by fitting together a plurality of metal plates 11a, 11b, . . . vertically and horizontally in a mutually orthogonal condition with separation of about 20 mm on a square metal frame 33 having openings at front and back are combined to produce a concave electrode subunit 32 wherein a large number of tunnel-shaped collection electrodes 11, 11, . . . of about 20 mm square and length 5 to 6 cm are arranged in lattice fashion.

Also, a convex electrode subunit 31 is constituted by electrode assemblies (the same number as collection electrodes 11, 11, . . . ), in which needle electrodes 8, 8, . . . project at the tips of deflection electrodes 12, 12, . . . in a condition with the needle tips 8a, 8a, . . . directed towards the exhaust inlet 22, being arranged in lattice fashion at positions corresponding, in one to one fashion, to collection electrodes 11, 11, . . . . These electrode assemblies are supported and fixed with metal linkage members 34, 34 assembled in the vertical and horizontal directions into a unit and linked together. These linkage members 34, 34 are connected through leads 20, 20 to the output terminal of the high voltage side of high voltage DC power source 13 and high voltages of mutually equal potentials are thereby applied to all of the needle electrodes 8, 8, . . . and deflection electrodes 12, 12, . . . . Linkage members 34, 34, . . . are fixed and supported through electrically insulating members 36, 36, . . . of hard resin or the like on a square support metal frame 35 having an opening at front and back.

At the front face of metal support frame 35, there is fixed a square metal frame 37, for purposes of slotting together, likewise provided with openings at its front and back faces; by slotting the metal frame 33 of concave electrode subunit 32 into this slotting-together metal frame 37, concave electrode subunit 32 is mounted in freely removable fashion within the metal support frame. In this way, all the collecting electrodes 11, 11, . . . which are arranged in lattice fashion are put into a condition of electrical contact with device casing 17 through metal frame 33, slotting-together metal frame 37 and metal support frame 35. Thus, since this device casing 17 is earthed when it is fixedly mounted on vehicle body 18, collecting electrodes 11, 11, . . . are also earthed. Furthermore, since electrically insulating members 36, 36, . . . are inserted between the electrode assemblies (needle electrodes 8, 8, . . . and deflection electrodes 12, 12, . . . ) and collecting electrodes 11, 11, . . . , both these are electrically isolated from each other. It should also be noted that, in this example, in collecting units 16, 16, the total of the cross-sectional areas of the gaps of collecting electrodes 11 and deflecting electrodes 12 that constitute the passage for the exhaust gas 25 is preferably set to be at least twice as great as the cross-sectional area of the diesel engine exhaust passage 25.

In the above construction, as shown in FIG. 3, when the engine key switch (ignition switch) 15 is turned ON, the engine is started up and simultaneously voltage of DC 24 V is supplied from battery 14 to high voltage DC power source 13. When high voltage DC power source 13 receives the voltage of DC 24 V that is supplied, it generates high voltage of DC 5 to 6 kV and outputs this to the front and rear collecting units 16, 16. Needle electrodes 8, 8, . . . , of which there are a large number arranged in lattice fashion, and deflecting electrodes 12, 12, . . . are thereby put at high potential; however, in particular, since the electric field is concentrated at the needle tips 8a, 8a, . . . of needle electrodes 8, 8, . . . , corona discharge 9, 9, . . . is continuously generated in stable fashion around needle tips 8a, 8a, . . . .

Consequently, when the exhaust gas 25 of the diesel engine passes over the respective needle tips 8a, 8a, . . . , gas molecules of comparatively low ionization energy such as residual oxygen in the exhaust are ionized, becoming positive ions, which are adsorbed on to carbon particles 10, 10, . . . , conferring a positive ionic charge on the particles themselves. Of these thus-charged carbon particles 10a, 10a, . . . , those nearest the correspondingly collected electrodes 11, 11, . . . are adsorbed on to the electrode plates of negative-potential collecting electrodes 11, 11, . . . . In contrast, charged carbon particles 10a, 10a, . . . that are more remote from the electrode plates of collecting electrodes 11, 11, . . . are first of all deflected (repelled) in the direction of collecting electrodes 11, 11, . . . by the positive potential of deflection electrode 12, and, when they approach collecting electrodes 11, 11, are adsorbed on to the electrode plates of negative-potential collecting electrodes 11, 11, . . . . It should be noted that the cross-sectional area of device casing 17 where the exhaust gas 25 discharged from the diesel engine flows into device casing 17 from exhaust inlet 22 is set sufficiently greater than the orthogonal cross-section of exhaust passage 23 of the diesel engine, so that the speed of the exhaust gas is lowered. Consequently, the black smoke can be efficiently adsorbed on to collecting electrodes 11, 11 before the exhaust gas is discharged to the external environment. Consequently, since, in the above construction, sets of collecting electrodes 11, 11, . . . , needle electrodes 8, 8, . . . , and deflecting electrodes 12, 12, . . . are arranged in lattice fashion and also arranged in two stages i.e. front and back, a continuous stable curtain of corona discharge is formed over a wide range at two locations at the front and at the back. Consequently, carbon particles 10, 10, . . . can be collected in reliable fashion. Consequently, continuous and stable corona discharges 9, 9, . . . can be obtained and also, since the diameter of the trunk portion is large, outstanding black smoke collection ability and durability can be obtained even under severe conditions such as when mounted in a vehicle.

[B] Second embodiment

Figure 9:
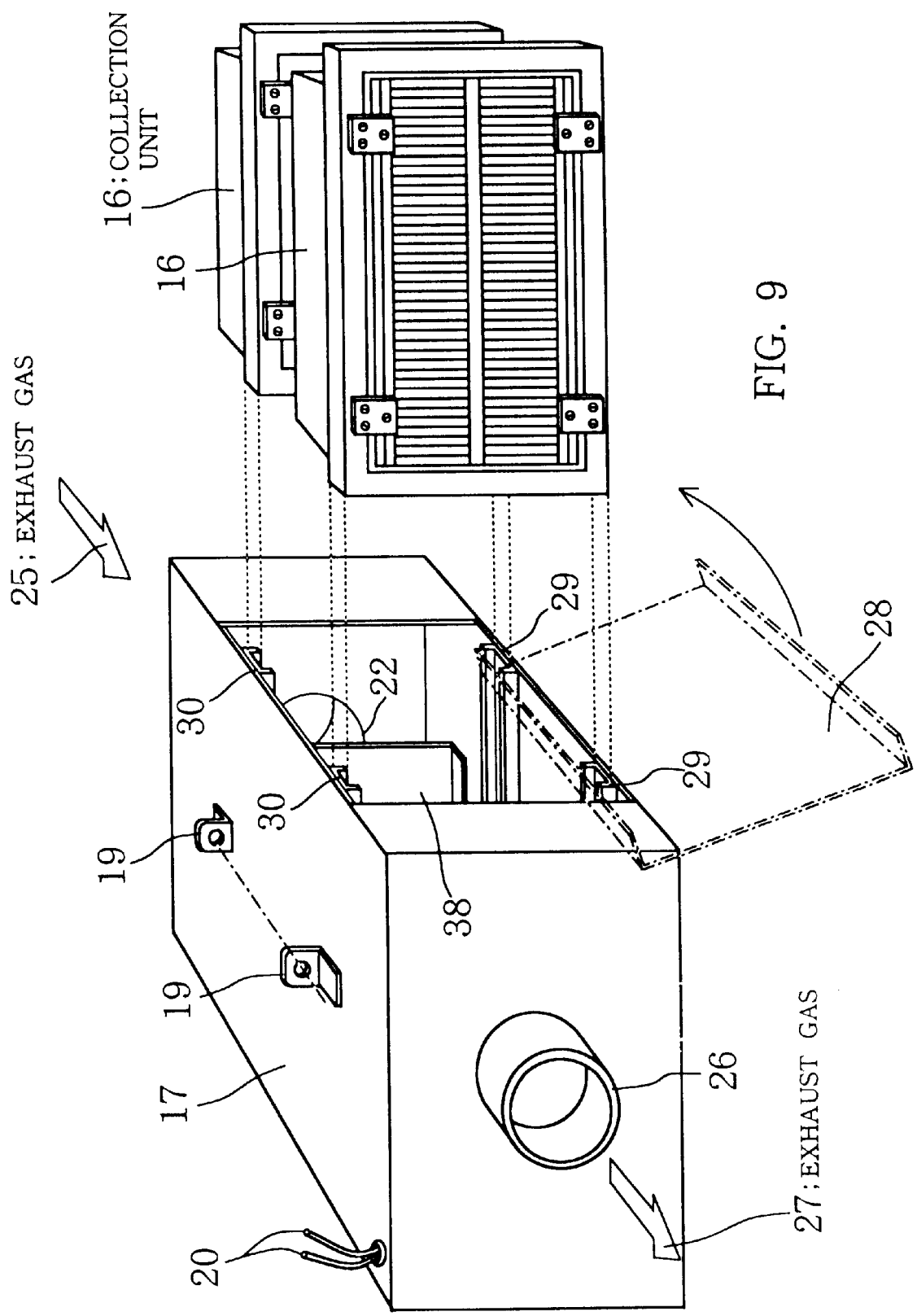
FIG. 9 is an exploded perspective view showing the construction of an electrically controlled diesel engine exhaust particle collection device according to a second embodiment of this invention.
Figure 10:
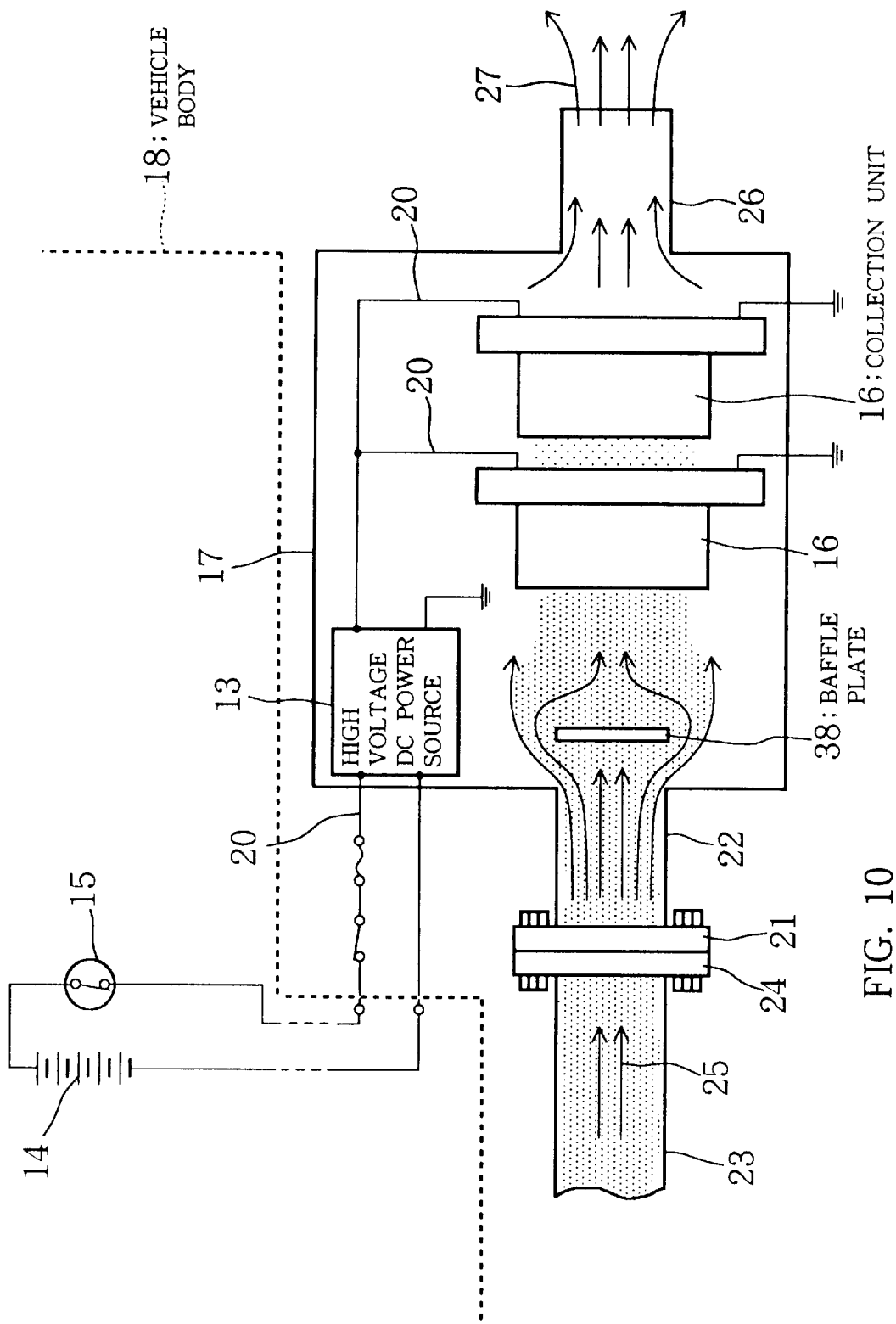
FIG. 10 a diagrammatic axial cross-sectional view showing the construction of this exhaust particle collection device.
Figure 11:
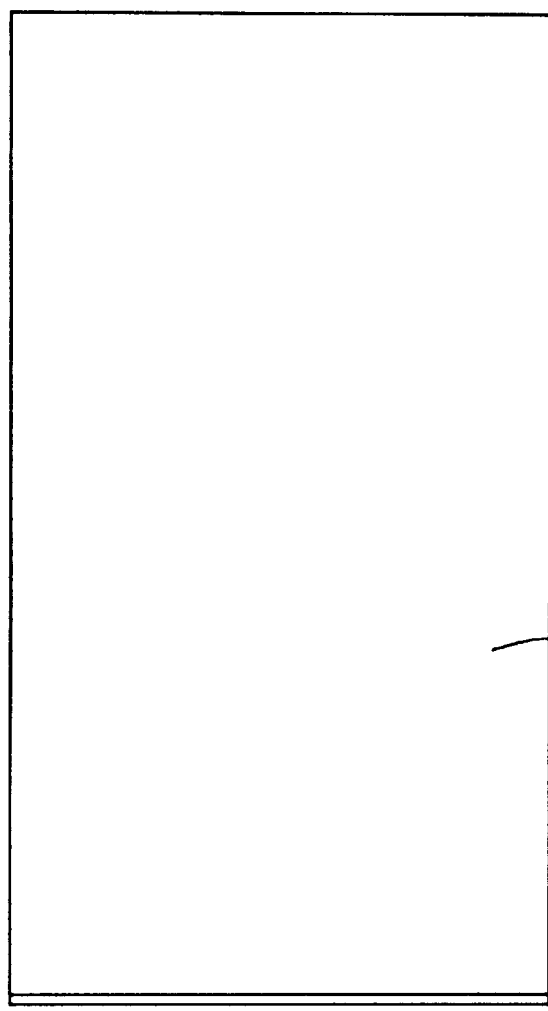
FIG. 11 is a view showing the construction of a baffle plate incorporated in this exhaust particle collection device, (a) being a back face view while (b) is a side face view.
Figure 11:
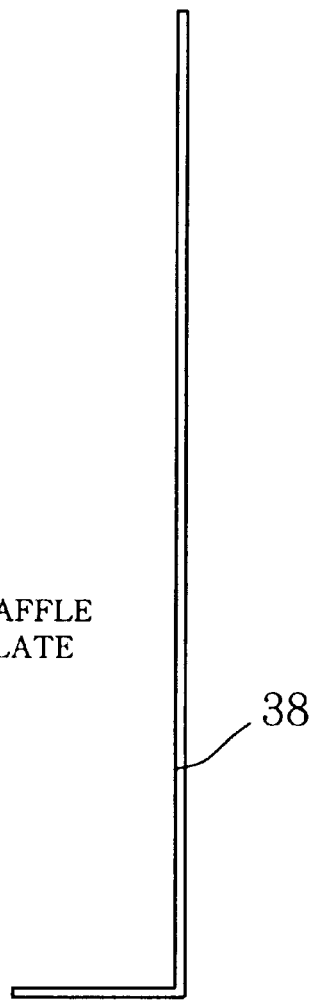

FIG. 9 is an exploded perspective view showing the construction of an electrically controlled diesel engine exhaust particle collection device according to a second embodiment of this invention; FIG. 10 is a diagrammatic axial cross-sectional view showing the construction of this exhaust particle collection device; and FIG. 11 is a view showing the construction of a baffle plate incorporated in this exhaust particle collection device, (a) being a back face view while (b) is a side face view;

The principal difference between the exhaust particle collection device of this example and the first embodiment described above is that a baffle plate 38 for reducing the speed of exhaust gas 25 is inserted between exhaust gas inlet 22 and the front-stage collection unit 16.

By providing such a baffle plate 38, the speed of the exhaust gas 25 can be further reduced, so further increasing the reliability of black smoke collection.

[C] Third embodiment

Figure 12:
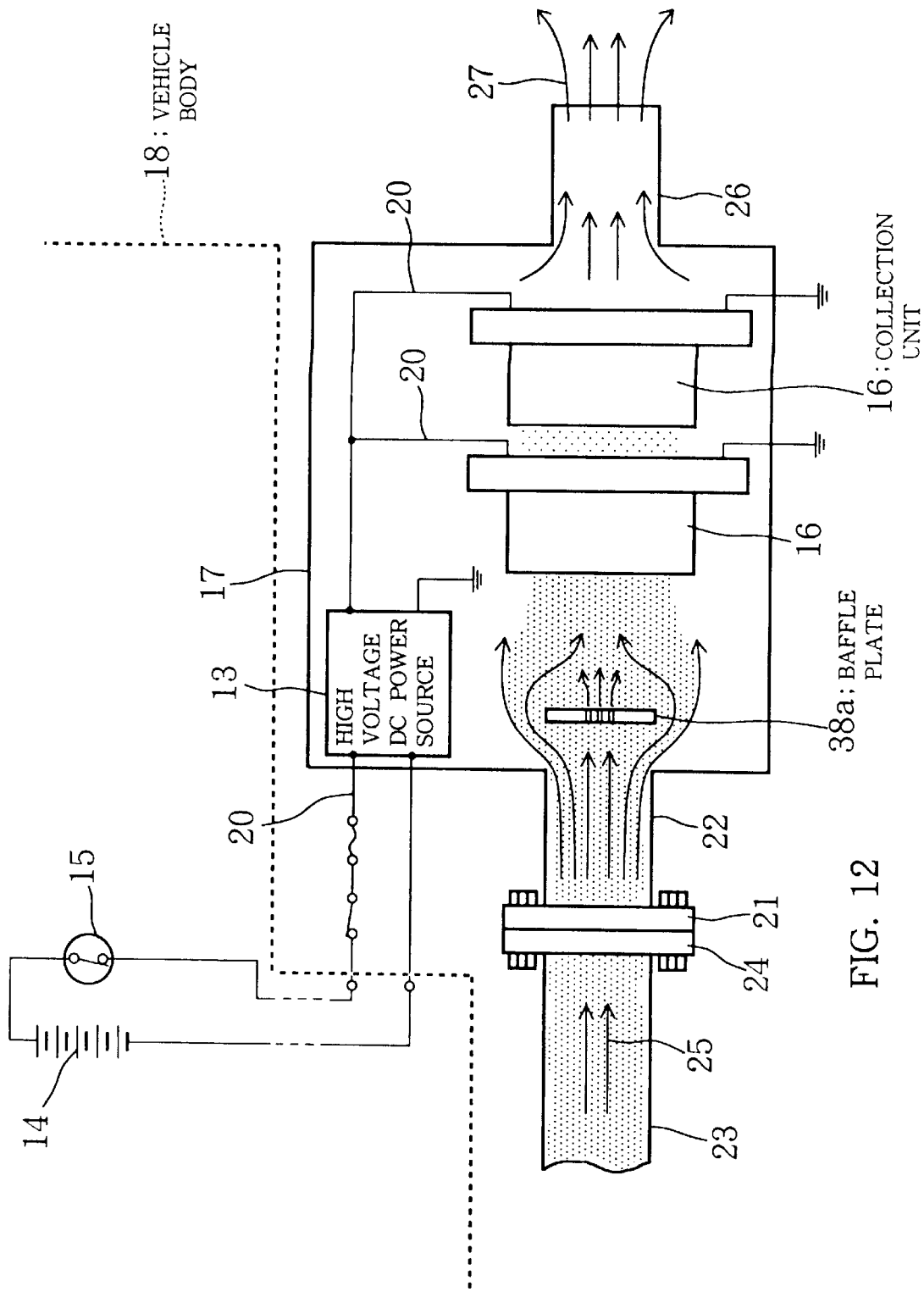
FIG. 12 is a diagrammatic axial cross-sectional show showing the construction of an electrically controlled diesel engine exhaust particle collection device according to a third embodiment of the present invention.

FIG. 12 is a diagrammatic axial cross-sectional show showing the construction of an electrically controlled diesel engine exhaust particle collection device according to a third embodiment of the present invention; and FIG. 13 is a view showing the construction of a baffle plate incorporated in this exhaust particle collection device, (a) being a rear face view while (b) is a side face view;

In this example, in place of the baffle plate 38 of the second embodiment, a baffle plate 38a formed with a large number of small holes 39, 39, . . . in the vicinity of its center in radial fashion is employed.

By means of the construction of this example, generally the same effect as in the second embodiment described above can be obtained. In addition, the benefit can be expected that this arrangement is preferable from the point of view of fluid dynamics in that the eddies which are liable to form at the rear face of the plate can be prevented. It should be noted that small holes 39, 39, . . . do not necessarily have to be distributed radially, but could be dispersed in irregular fashion.

[D] Fourth embodiment

Figure 14:
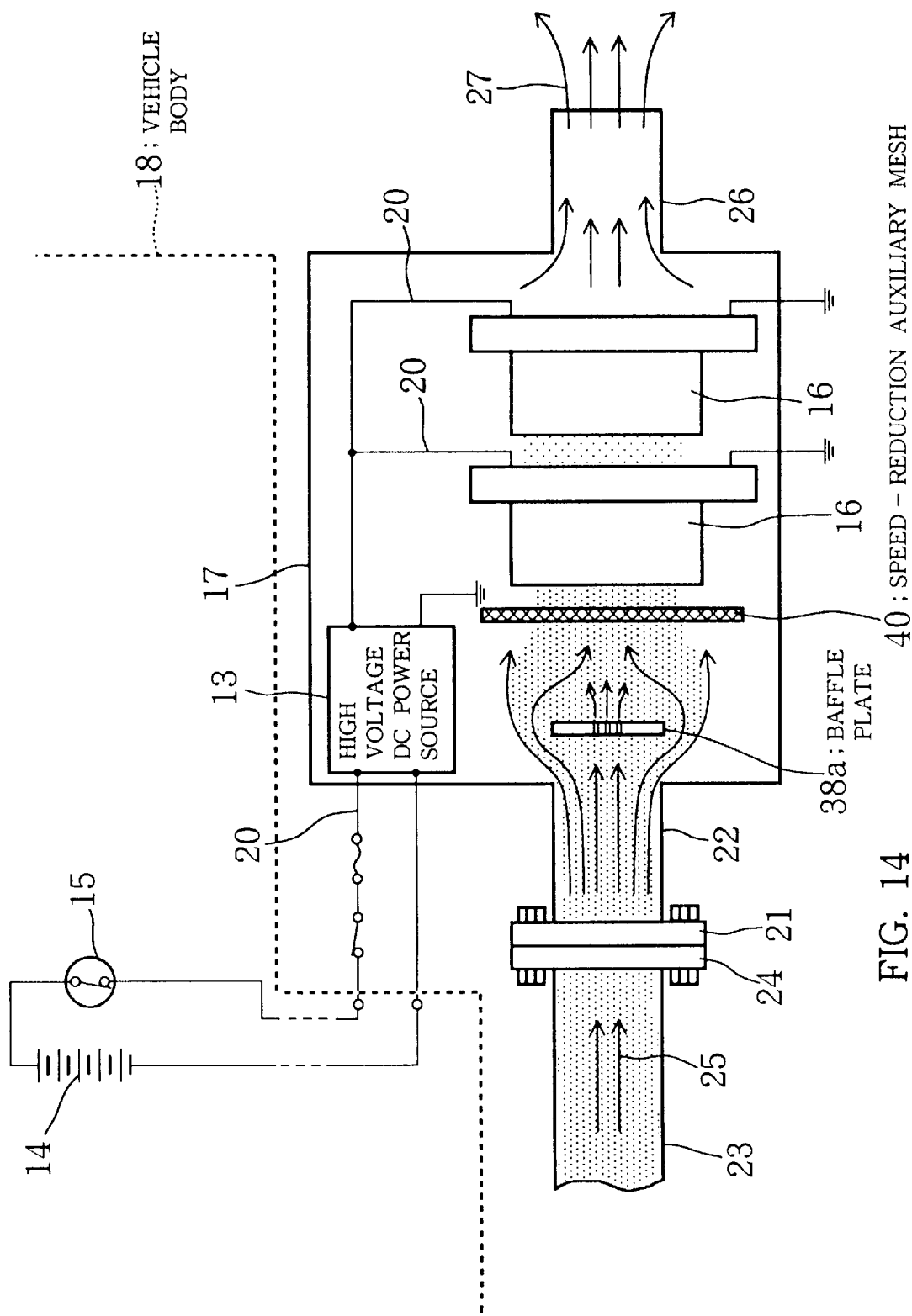
FIG. 14 is a diagrammatic axial cross-sectional view showing the construction of an electrically controlled diesel engine exhaust particle collection device constituting a fourth embodiment of the present invention.
Figure 15:
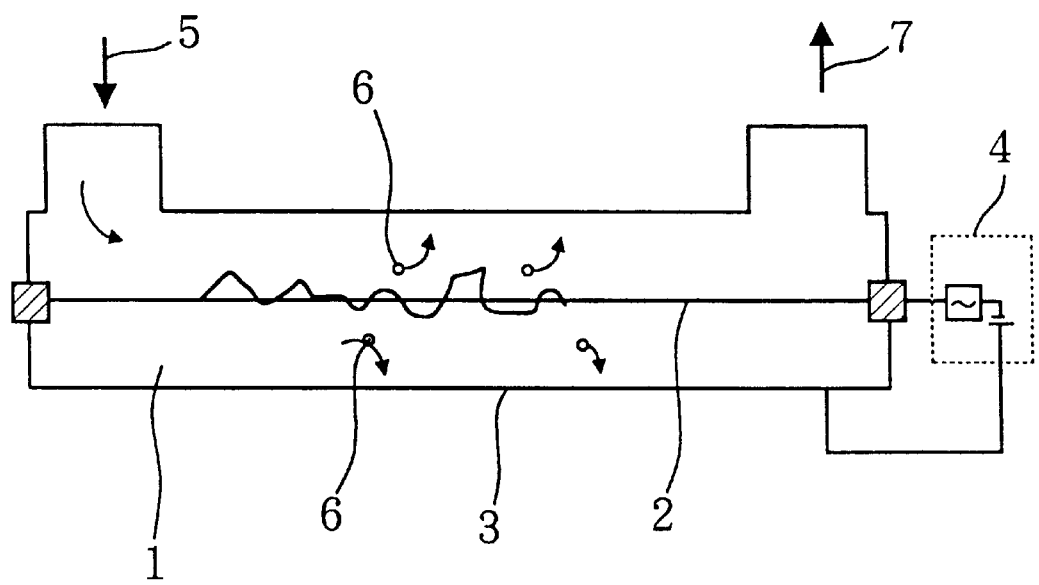
FIG. 15 is an axial cross-sectional view showing the construction of a conventional electrostatic diesel particle filter.

FIG. 14 is a diagrammatic axial cross-section showing the construction of an electrically controlled diesel engine exhaust particle collection device according to a fourth embodiment of the present invention.

In the exhaust particle collection device of this example, in addition to the construction of the third embodiment described above, for example an auxiliary mesh 40 for purposes of flow-speed reduction consisting of refractory material such as stainless steel is provided immediately downstream of baffle plate 38a. With the construction of this example, in addition to some of the black smoke being adsorbed on to the speed-reduction auxiliary mesh 40, the exhaust gas 25 is considerably slowed down, so the efficiency of black smoke collection can be reliably increased yet further than in the case of the construction of the second embodiment.

Although embodiments of the present invention have been described in detail with reference to the drawings, the specific construction is not restricted to that of these embodiments, and design modifications etc. that do not depart from the essence of the present invention are also included in the present invention.

For example, the shape and number of needle electrodes 8, collecting electrodes 11, and deflection electrodes 12 can be modified as required and the number of collection units 16 can be increased or decreased as required. Also, although, in the embodiments described above, the case was described in which the exhaust particle collection device was mounted downstream of the silencer, there is no restriction to this, and it could be mounted upstream of the silencer. Also, conductive ceramics could be employed as the structural material of the collecting electrodes 11 instead of metallic material.

What is claimed is:

1. A diesel engine exhaust particle collection device for collecting, under electrical control, particles in an exhaust from a diesel engine, comprising:

a needle electrode having a needle tip for charging up said particles by creating a corona discharge around said needle tip;

a collecting electrode for collecting said charged particles by electrostatic force;

a deflection electrode for imparting deflection force to said charged particles towards said collecting electrode;

a high voltage power source for applying a prescribed high voltage between said needle electrode and said collecting electrode and between said deflection electrode and said collecting electrode;

said needle electrode being fixed to a tip of said deflection electrode;

said deflection electrode being rod-shaped and larger in diameter than said needle electrode, a shoulder portion being formed thereby;

wherein exhaust gas passing close to said needle electrode is disturbed in flow by said shoulder portion and forced to stay for a longer period of time in said corona discharge.

2. A diesel engine exhaust particle collection device according to claim 1, wherein said needle tip being directed toward an upstream side of said exhaust passage, thereby forming an electrode assembly of said needle electrode and said deflection electrode.

3. A diesel engine exhaust particle collection device according to claim 2, wherein at least one tunnel through which exhaust gases pass are defined by an electrode plate of said collecting electrode, said electrode assembly being disposed within said tunnel.

4. A diesel engine exhaust particle collection device according to claim 3, wherein a number of tunnels demarcated by the electrode plates of said collecting electrodes are arranged in lattice fashion, said electrode assembly consisting of a needle electrode and a deflection electrode being arranged within a respective one of said tunnels.

5. A diesel engine exhaust particle collection device according to claim 4, having one or more collection units wherein a number of said tunnels demarcated by the electrode plates of said collecting electrodes are arranged in lattice fashion and said electrode assembly consisting of a needle electrode and a deflection electrode is arranged in each said tunnel and a device casing provided with an inlet and outlet for said exhaust and that holds said collection units received therein.

6. A diesel engine exhaust particle collection device according to claim 5, wherein said collection unit is removably received and disposed in said device casing.

7. A diesel engine exhaust particle collection device according to claim 6, wherein said collection unit comprises a concave electrode subunit including a number of said tunnels demarcated in lattice fashion by the electrode plates of said collecting electrodes, and a convex electrode subunit including a plurality of said electrode assemblies consisting of a needle electrode and a deflection electrode, respectively corresponding to said tunnels, and wherein said concave electrode subunit and said convex electrode subunit are slotted together in a freely removable state.

8. A diesel engine exhaust particle collection device according to claims 5, 6 or 7, wherein of the cross-sectional area of said collection unit, the area of the region that essentially constitutes a channel for the exhaust is set to be at least twice as great as the cross-sectional area of said exhaust passage of the diesel engine.

9. A diesel engine exhaust particle collection device according to claim 1, wherein positive-polarity high voltage is applied to said needle electrode, thereby generating positive ions by creating a corona discharge around the needle tip, whereas said collecting electrode are earthed.

10. A diesel engine exhaust particle collection device according to claim 1, wherein speed reduction means for smoothly slowing down exhaust flow is provided in a vicinity of said needle electrode.

11. A diesel engine exhaust particle collection device according to claim 1, wherein said diesel engine is a
vehicle-mounted diesel engine.

\* \* \* \* \*